S. C. SCHOFIELD.
Grain Drill.
No. 27,477.
Patented Mar. 13, 1860.
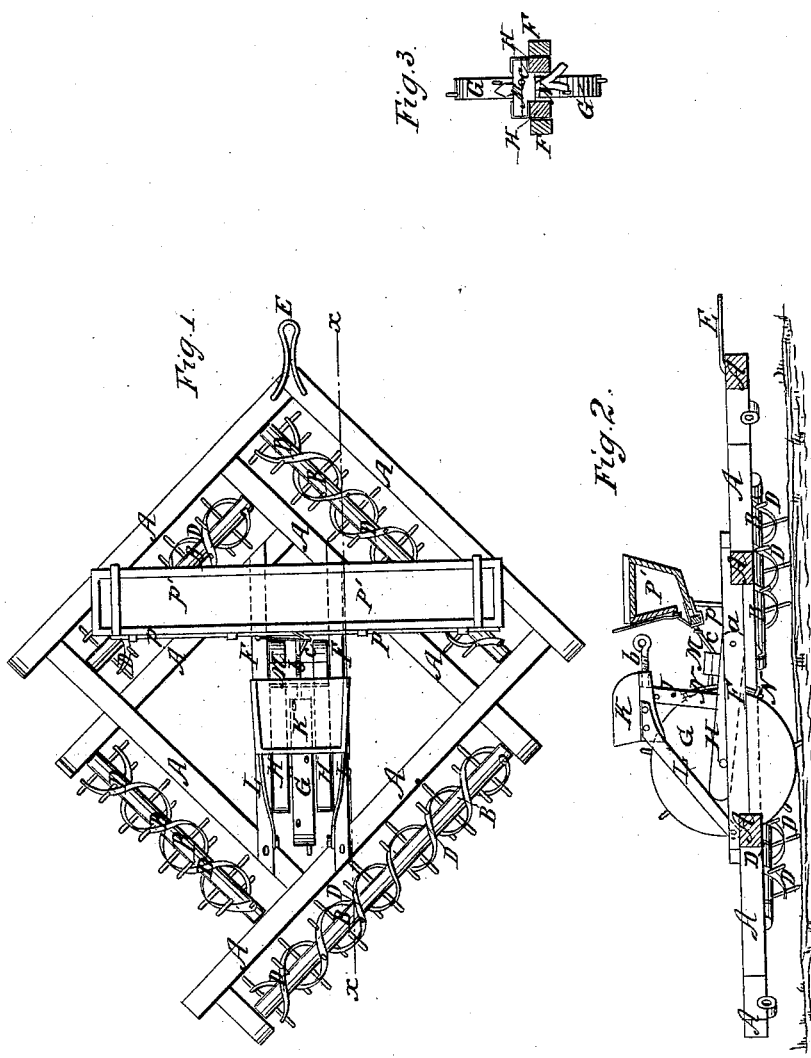

UNITED STATES PATENT OFFICE.

SILAS C. SCHOFIELD, OF FREEPORT, ILLINOIS.

IMPROVEMENT IN HARROWS.

Specification forming part of Letters Patent No. 27,477, dated March 13, 1860.

*To all whom it may concern:*

Be it known that I, SILAS C. SCHOFIELD, of Freeport, in the county of Stephenson and State of Illinois, have invented a new and useful Combined Seed-Sower and Harrow; and I do hereby declare that the following is a full, clear, and exact description thereof, reference being had to the accompanying drawings, forming a part of this specification, in which—

Figure 1 represents a plan view of my combined seed-sower and harrow with the parts all arranged in their respective positions for operation. Fig. 2 is a longitudinal vertical section taken through the red line $xx$ of Fig. 1, showing clearly the manner of raising or depressing the harrow. Fig. 3 is a section detached from the machine, showing the driving-wheel and the means of vibrating the seed-distributing slide.

Similar letters of reference indicate corresponding parts in the three figures.

To enable those skilled in the art to fully understand my invention, I will proceed to describe its construction and operation.

In the drawings, A A represent the frame of the machine, along the four sides of which the harrow-shafts B are arranged, having end bearings in the right-angular timbers A A, and capable of turning freely in their bearings. These harrows are furnished with teeth, which project out radially from the axis of their shafts B.

D are strips of iron coiled round the harrows concentric with their axes, extending from end to end of the shafts B and at a suitable distance from the points of the harrow-teeth. These coiled metal strips are secured to the harrow-teeth, and serve a very good purpose as pulverizers for breaking up the lumps of earth at the same time of harrowing in the seed as the machine is drawn along and the harrows rotated. This construction of a rotary harrow, combining a pulverizer, is very simple, efficient, and useful for the purpose intended. The draft-chain is attached to the frame of the machine at E, so that the line of draft will be diagonal with the frame A A.

Between two longitudinal bars, F F, fixed to the frame A A, is a wheel, G, which has its bearings in two arms, H H, which are pivoted or jointed at their forward ends, as shown at $a$, Fig. 2. This attachment of the arms H H is about at the middle of frame A A.

Just in rear of the pivot $a$ are two standards, J J, upon which the driver's seat K rests, which is connected to two braces, L L. These extend back, and are jointed to the rear ends of bars F F, or, which would be the same in effect, to the frame A A.

In front of the driver's seat is a set-screw, $b$, which acts against a cross-bar on the top of standard J J, and which by screwing up or unscrewing the frame A A may be elevated or depressed. The sides of the driver's seat only are supported by the standards J J, and these sides rest on pins projecting from either side of the standards, and over these pieces friction-rollers may be placed, if necessary.

In front of the wheel G, and secured to the arms H H, is a block, M, through which passes a rod, $c$, which is operated by a dog, N, said dog receiving its motion from pins which project alternately from one side to the other. From the periphery of the wheel G these pins give to the dog a vibrating motion, which motion is transmitted to a seed-slide, P, of a hopper, P', for distributing the seed regularly from the hopper and to keep up a constant and free flow of seed from the hopper as the machine advances. This seed-slide is connected together at the middle of its length by a suitable attachment, and the hopper is divided centrally by a partition. The attachment of the dog N is with one-half of the seed-slide, so that when the slide itself is separated into two parts the seed may be scattered from only one-half of the hopper, and then by attaching the two parts of the slide together the seed may be scattered from both apartments of the hopper.

The seed-hopper extends transversely across the frame A A in front of the driver's seat and in rear of the front harrows. The seed flows from the hopper into the harrowed earth, and is harrowed in by the succeeding harrows. The hopper is provided with an adjustable plate, which may be operated by a lever from the driver's seat for regulating the flow of seed from the mouth of the hopper.

The construction of the hopper, the device for regulating the flow of seed therefrom, and the distributing seed-slide, with the plan of operating it, are all old devices, and to these ends I lay no claim.

Having thus described my invention, what I claim, and desire to secure by Letters Patent, is—

1. The combination, with the teeth of a rotary harrow, of a strip of metal running spirally from end to end of the harrow and fixed at an intermediate point between the ends of the teeth and the harrow-shaft, as herein set forth.

2. The combination, with the harrow-frame and rotary harrows, of the wheel G, hung in arms H H, which are jointed to the main frame, standards J J, and driver's seat K, when this seat is connected to the frame by jointed braces L L and furnished with a set screw, $b$, for raising the frame A A, in the manner herein set forth, at the same time allowing the frame to swing freely on the joint $a$ and adapt itself to the unevenness of the ground.

SILAS C. SCHOFIELD.

Witnesses:
OLIVER M. BREWSTER,
JOSEPH B. SMITH.